Patented Oct. 29, 1935

2,018,781

UNITED STATES PATENT OFFICE 2,018,781

METHOD FOR THE PRODUCTION OF STORABLE MIXTURES OF LECITHIN AND OIL

August Gehrke, Harburg-Wilhelmsburg, Germany

No Drawing. Application August 14, 1933, Serial No. 685,154. In Germany November 21, 1932

6 Claims. (Cl. 99—11)

This invention relates to an improved method for the production of storable mixtures of lecithin and oil from fresh soya sludge.

The soya sludge which is produced in the extraction of soya beans for the purpose of obtaining the oil and which is composed essentially of lecithin, oil and water commences to ferment a short time after the extraction. For this reason the lecithin is decomposed, acquiring a dark colour and a very objectionable taste and odour. Moreover its solubility and its ability to be emulsified are unfavourably affected. If the lecithin of such fermented soya sludge is to be used for nutrient purposes, for example, as addition to margarine or chocolate, for pharmaceutical and dietetic purposes as well as for technical purposes, it is necessary to first subject it to an involved and costly purification and separation with organic solvent materials.

In order to avoid these undesirable developments it has been proposed previously to drive off the water from the fresh soya sludge by heating the same under reduced pressure. However, even by exercising extreme care, and in spite of the oil which is present decomposition of the extremely heat sensitive lecithin cannot be avoided. More particularly its solubility is reduced. Furthermore it is very difficult to remove the last traces of water from the smooth waxy mass. If this water is not removed the oil-containing lecithin is very apt to become infected with mould micro-organisms.

I have now found that a storable mixture of lecithin and soya oil which does not easily become infected with moulds, may be obtained from soya sludge in a very simple and reliable manner, if the fresh sludge immediately after its separation from the oil, is intimately mixed with glycerine for the purpose of removing the greater portion of the water contained therein. The process is preferably repeated at least once. The water contained in the lecithin oil mixture is further reduced by repeated treatment with glycerine and the desired effect enhanced. A part of the water still retained by the lecithin-oil mixture may be removed by centrifuging. The lecithin-oil mixture separating as a waxy mass is removed from the liquid and possesses a good storability and can be employed directly for nutrient purposes and for technical applications without further purification. Since it is obtained without detrimental heating, it has excellent solubility.

Lecithin is important as an excellent emulsifying agent; it has been proposed previously to produce solutions thereof by dissolving it in freshly prepared condition in glycerine. It would therefore be expected that, by treatment of fresh soya sludge with glycerine, either a solution or an emulsion which was not further separable would result. However, it has been found that neither contingency materializes. Although small proportions of glycerine are retained by the lecithin this is without significance since preeminently the freeing of the main portion thereof from water is successfully effected in a simple manner so that the product obtained does not undergo fermentation and does not become mouldy.

Particularly good results in respect of water separation and the storability of the product obtained are attained by the use of the most anhydrous glycerine obtainable in which the maximum amount of dry sugar is dissolved, so that a mixture of specific gravity 1.36–1.39 results. The water may be reduced to 10% in soya sludge treated with this mixture. The water removal can in this case also be further increased by centrifuging in a rapidly rotating centrifuge, a portion of the oil being also removed.

In carrying out the process, for example, 100 kg. of an emulsion comprising 50 parts of water, 40 parts of lecithin and 10 parts of soya oil are heated to approximately 60° C., whereupon, with slow stirring, 50 kg. of anhydrous glycerine are introduced. It is then stirred slowly for a further period, to prevent settling. After uniform distribution of the glycerine, it is stirred somewhat more rapidly for about ¼ hour. It is then allowed to stand so that the separation of the lecithin-oil mixture, which floats at the surface, from the water containing glycerine results. The liquid and the solids are separated one from the other. The glycerine can again be rendered anhydrous by distillation and can be used over again.

If the soya sludge and glycerine are stirred together more energetically or without warming, then an emulsion is first formed which requires a longer time for its separation although it may, however, be rapidly separated by centrifuging.

Further, the process can be so carried out that an emulsion which is composed of 50 parts of water, 40 parts of lecithin and 10 parts of soya oil is heated to about 60° C. and thereupon, with slow stirring, 25–50 kg. of a mixture of anhydrous glycerine, in which so much dry sugar is dissolved that it has a specific gravity of 1.36–1.39, is introduced. The emulsion separating consisting of lecithin, oil and water is further treated in the same manner until the water content has been reduced to 10%. In association with this the material is centrifuged in a rapidly rotating centrifuge, whereby, at the same time, a portion of the oil is removed.

I claim:—

1. Improved method for the production of storable mixtures of lecithin and oil from fresh soya sludge, in which the soya sludge is intimately admixed with glycerine and the undissolved solid portions are thereupon separated from the mixture of glycerine and water.

2. Improved method for the production of storable mixtures of lecithin and oil from fresh soya sludge, in which the soya sludge is intimately admixed with a mixture of anhydrous glycerine, in which so much dry sugar is dissolved that it has a specific gravity of 1.36–1.39 and the solid undissolved portions are thereupon separated from the mixture of glycerine, water and sugar.

3. Improved method for the production of storable mixtures of lecithin and oil from fresh soya sludge, in which the soya sludge is repeatedly intimately admixed with glycerine and the solid undissolved portions are thereupon separated from the mixture containing glycerine and water.

4. Improved method for the production of storable mixtures of lecithin and oil from fresh soya sludge, in which the soya sludge is repeatedly intimately admixed with a mixture of anhydrous glycerine, in which so much dry sugar is dissolved that it has a specific gravity of 1.36–1.39 and the insoluble portions are separated from the aqueous glycerine-sugar mixture.

5. Improved method for the production of storable mixtures of lecithin and oil from fresh soya sludge, in which the soya sludge is intimately admixed with glycerine and the portions of the sludge which are not dissolved in the glycerine are in major part separated from most of the glycerine and water mixture, and the part of the oil and the aqueous solution retained in the lecithin emulsion after the treatment with the dehydrating agent is removed by centrifuging in a rapidly rotating centrifuge.

6. Improved method for the production of storable mixtures of lecithin and oil from fresh soya sludge, in which the soya sludge is intimately admixed with a mixture of anhydrous glycerine, in which so much dry sugar is dissolved that it has a specific gravity of 1.36–1.39 and the solid portions separating from the solution are thereupon removed therefrom, a part of the oil and the aqueous solution retained in the lecithin emulsion after the treatment with the dehydrating agent is removed by centrifuging with a rapidly rotating centrifuge.

AUGUST GEHRKE.